US012512675B2

(12) United States Patent
Nakamura et al.

(10) Patent No.: US 12,512,675 B2
(45) Date of Patent: Dec. 30, 2025

(54) POWER CONVERSION SYSTEM

(71) Applicant: Mitsubishi Electric Corporation, Tokyo (JP)

(72) Inventors: Fuminori Nakamura, Tokyo (JP); Ryota Onishi, Tokyo (JP); Michihiro Tadokoro, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 159 days.

(21) Appl. No.: 17/918,804

(22) PCT Filed: May 21, 2020

(86) PCT No.: PCT/JP2020/020156
§ 371 (c)(1),
(2) Date: Oct. 13, 2022

(87) PCT Pub. No.: WO2021/234919
PCT Pub. Date: Nov. 25, 2021

(65) Prior Publication Data
US 2023/0352942 A1     Nov. 2, 2023

(51) Int. Cl.
*H02J 3/36* (2006.01)
*H02H 7/12* (2006.01)
(Continued)

(52) U.S. Cl.
CPC ............... *H02J 3/36* (2013.01); *H02H 7/12* (2013.01); *H02H 7/1257* (2013.01); *H02M 7/4835* (2021.05)

(58) Field of Classification Search
CPC .............. H02J 3/36; H02H 7/10–1206; H02H 7/122–127; H02H 9/04–042; H02M 7/4835
See application file for complete search history.

(56) References Cited

U.S. PATENT DOCUMENTS

2012/0120691 A1* 5/2012 Armschat ............ H02M 7/4835
363/64
2017/0302189 A1* 10/2017 Jakob ........................ H02J 3/36
(Continued)

FOREIGN PATENT DOCUMENTS

CN         103891082 A  *  6/2014  ........... H02H 7/1255
CN         105659465 A  *  6/2016  ........... H02H 7/1252
(Continued)

OTHER PUBLICATIONS

Machine translation of CN 103891082 A, orig. pub. Jun. 25, 2014. Obtained from internal USPTO databases on Jul. 10, 2024. (Year: 2014).*
Machine translation of CN 105659465 A, orig. pub. Jun. 8, 2016. Obtained from internal USPTO databases on Jul. 10, 2024. (Year: 2016).*
(Continued)

*Primary Examiner* — Fred E Finch, III
(74) *Attorney, Agent, or Firm* — Buchanan Ingersoll & Rooney PC

(57) ABSTRACT

A power conversion system including: a self-excited power converter that converts power between an alternating-current (AC) power system and a direct-current (DC) line; an AC circuit breaker disposed between the AC power system and the self-excited power converter; an arrester connected between the DC line and a ground or between an AC line and the ground, the AC line connecting the AC circuit breaker and the self-excited power converter; and a control device. The control device causes the self-excited power converter to stop a switching operation when the control device detects a ground fault accident on the DC line, and opens the AC circuit breaker after the self-excited power converter stops the switching operation.

8 Claims, 14 Drawing Sheets

(51) Int. Cl.
  *H02H 7/125*  (2006.01)
  *H02M 7/483*  (2007.01)

(56) References Cited

U.S. PATENT DOCUMENTS

| | | | |
|---|---|---|---|
| 2018/0076727 A1 | 3/2018 | Bakran et al. | |
| 2018/0076735 A1* | 3/2018 | Bakran | H02H 9/02 |
| 2019/0386578 A1* | 12/2019 | Kajiyama | H02H 7/1216 |
| 2020/0212792 A1* | 7/2020 | Westerweller | H02M 7/4835 |
| 2020/0389084 A1* | 12/2020 | Ergin | H01H 33/596 |

FOREIGN PATENT DOCUMENTS

| | | | | |
|---|---|---|---|---|
| EP | 3107172 | A1 | 12/2016 | |
| EP | 3588764 | A1 | 1/2020 | |
| EP | 3648274 | A1 | 5/2020 | |
| JP | 2014236306 | A | 12/2014 | |
| JP | 2015-142466 | A | 8/2015 | |
| JP | 2017192179 | A | 10/2017 | |
| JP | 2018046642 | A | 3/2018 | |
| JP | 2020-054223 | A | 4/2020 | |
| WO | 2016/155837 | A1 | 10/2016 | |
| WO | WO-2019020186 | A1 * | 1/2019 | H02H 7/122 |
| WO | 2019043758 | A1 | 3/2019 | |

OTHER PUBLICATIONS

Machine translation of JP 2014/236306 (Toshiba), orig. pub. Dec. 15, 2014. (Year: 2014).*

Extended European Search Report dated May 2, 2023, issued in the corresponding European Patent Application No. 20936557.6, 9 pages.

Extended European Search Report dated May 2, 2023, issued in the corresponding European Patent Application No. 22213843.0, 8 pages.

Tang, et al., "Protection of VSC-Multi-Terminal HVDC against DC Faults", Power Electronics Specialists Conference (Annual Power Electronics Specialists Conference), vol. 2, Jun. 23, 2002, pp. 719-724.

Arai et al. "The Voltage-Sourced Converter applied to New Hokkaido-Honshu HVDC Link", CIGRE—IEC 2019 Conference on EHV and UHV (AC & DC), Apr. 23-26, 2019, Hakodate, Hokkaido, Japan. pp. 1-9.

International Search Report (PCT/ISA/210) with translation and Written Opinion (PCT/ISA/237) mailed on Jul. 28, 2020, by the Japan Patent Office as the International Searching Authority for International Application No. PCT/JP2020/020156. (8 pages).

Communication pursuant to Article 94(3) EPC dated Oct. 6, 2025, issued in the corresponding European Patent Application No. EP 22213843.0, 6 pages.

* cited by examiner (a)      (b)

10H

POWER CONVERSION SYSTEM

TECHNICAL FIELD

The present disclosure relates to a power conversion system.

BACKGROUND ART

A modular multilevel converter (hereinafter, also referred to as a MMC converter), in which multiple unit converters are cascade-connected, can readily handle a higher voltage by increasing the number of unit converters. The "unit converter" is also referred to as a "sub module" or "converter cell." The MMC converter is widely applied to transmission and distribution grids, as a large-capacity static VAR compensator or as a power conversion device for high-voltage direct-current (DC) power transmission.

Japanese Patent Laying-Open No. 2017-192179 (PTL 1) discloses a DC protection relay system for preventing false detection of fault current.

CITATION LIST

Patent Literature

PTL 1: Japanese Patent Laying-Open No. 2017-192179

SUMMARY OF INVENTION

Technical Problem

A power conversion system which includes a MMC self-excited power converter may adopt a configuration in which one end of a DC line is grounded and the other end of the DC line is ungrounded. With this configuration, in the event of ground fault on the ungrounded side, DC short causes overcurrent to flow through respective elements included in the power converter, and the elements may break down. PTL 1 discloses conducting away the overcurrent through an overcurrent protector, which is an arrester, so that a thyristor valve does not break down in the event of commutation failure. However, PTL 1 fails to teach or suggest any solution to the problem noted above.

An object of a certain aspect of the present disclosure is to provide a power conversion system which can prevent overcurrent from flowing through a self-excited power converter and suppress the voltage on the DC side of the power converter in the event of ground fault on the DC side.

Solution to Problem

A power conversion system according to a certain embodiment includes: a self-excited power converter that converts power between an alternating-current (AC) power system and a direct-current (DC) line; an AC circuit breaker disposed between the AC power system and the self-excited power converter; an arrester connected between the DC line and a ground or between an AC line and the ground, the AC line connecting the AC circuit breaker and the self-excited power converter; and a control device. The control device: causes the self-excited power converter to stop a switching operation when the control device detects a ground fault accident on the DC line; and opens the AC circuit breaker after the self-excited power converter stops the switching operation.

A power conversion system according to another embodiment includes: a self-excited power converter that converts power between an alternating-current (AC) power system and a direct-current (DC) line; a DC circuit breaker disposed between the DC line and the self-excited power converter; an arrester connected between the DC line and a ground or between an AC line and the ground, the AC line connecting the DC circuit breaker and the self-excited power converter; and a control device. The control device: causes the self-excited power converter to stop a switching operation when the control device detects a ground fault accident on the DC line; and opens the DC circuit breaker after the self-excited power converter stops the switching operation.

ADVANTAGEOUS EFFECTS OF INVENTION

According to the present disclosure, the overcurrent can be prevented from flowing through the power converter and the voltage on the DC side of the self-excited power converter can be suppressed in the event of ground fault on the DC side.

DESCRIPTION OF EMBODIMENTS

Hereinafter, embodiments are described, with reference to the accompanying drawings. In the following description, like reference signs refer to like parts. Their names and functionalities are also the same. Thus, detailed description thereof will not be repeated.

Embodiment 1

Overall System Configuration

Figure 1:
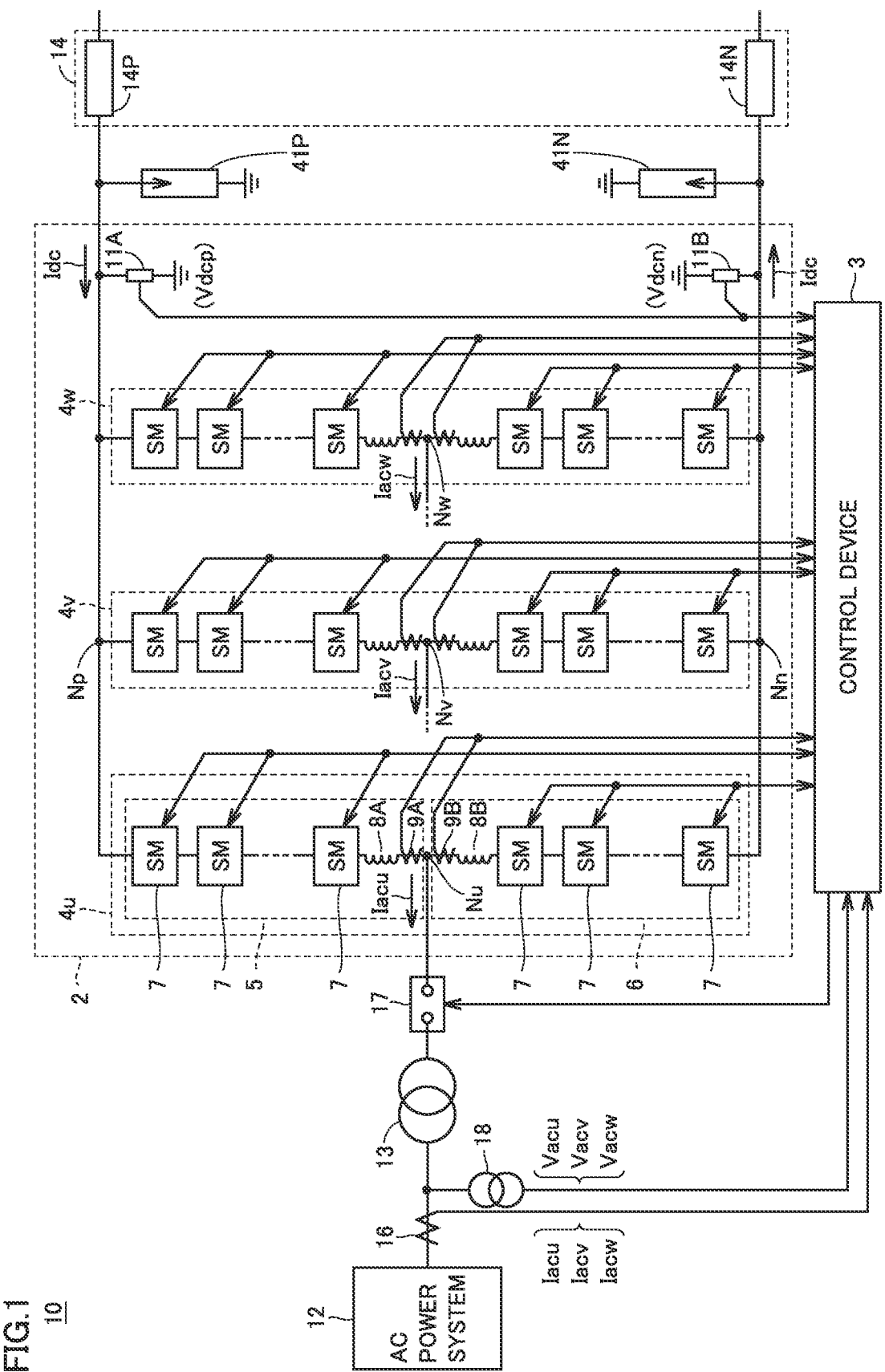
FIG. 1 is a schematic configuration diagram of a power conversion system according to Embodiment 1.

FIG. 1 is a schematic configuration diagram of a power conversion system 10 according to Embodiment 1. Referring to FIG. 1, the power conversion system 10 includes a power converter 2, a control device 3, arresters 41P and 41N (hereinafter, also collectively referred to as an "arrester 41"), a transformer 13, and an alternating-current (AC) circuit breaker 17.

For example, the power conversion system 10 is a system for controlling the power of a direct-current (DC) power transmission system in a unipolar configuration. A power is transmitted/received between an AC power system 12 and another AC power system via a positive-side DC line 14P and a negative-side DC line 14N of a DC line 14. The AC power system 12 and the other AC power system are three-phase AC power systems. The AC circuit breaker 17 is disposed between the AC power system 12 and the power converter 2.

In FIG. 1, if the power conversion system 10 corresponds to a high voltage direct current (HVDC) system, the DC lines 14P and 14N have lengths of tens of kilometers through hundreds kilometers, for example. If the power conversion system 10 corresponds to a back to back (BTB) system, the DC lines 14P and 14N have lengths of a few meters to tens of meters, for example. Note that FIG. 1 shows a DC power system that has two terminals.

The power converter 2 is a self-excited power converter 2, which converts power between the DC line 14 and the AC power system 12. Typically, the power converter 2 is configured of a modular multilevel converter (MMC) power converter which includes multiple sub modules (sub module) (corresponding to "SM" of FIG. 1) 7 that are connected in series. However, the power converter 2 may be of any conversion type, other than the MMC. The power converter 2 is connected to the DC lines 14P and 14N. The power converter 2 is also connected to the AC power system 12 via the AC circuit breaker 17 and the transformer 13.

The control device 3 controls operations of the power converter 2 and opening and closing of the AC circuit breaker 17. Note that separate devices may implement the control device 3's functions of controlling the operations of the power converter 2 and controlling the opening and closing of the AC circuit breaker 17.

The transformer 13 is connected between the AC power system 12 and the AC circuit breaker 17. Specifically, the transformer 13 has the primary side connected to the AC power system 12, and the secondary side connected to the AC circuit breaker 17.

The arrester 41 is connected between the DC line 14 and the ground. Specifically, the arrester 41P is connected between the positive-side DC line 14P of the DC line 14 and the ground. The arrester 41N is connected between the negative-side DC line 14N of the DC line 14 and the ground. As describe below in detail, the arrester 41 is disposed to suppress overvoltage, which is developed at the DC line 14 associated with a ground fault accident of the DC line 14.

Configuration of Power Converter

Referring to FIG. 1, a configuration of the power converter 2 is now described. The power converter 2 includes multiple leg circuits 4u, 4v, and 4w (hereinafter, described as a "leg circuit 4" when referring to them collectively or any of them) that are connected in parallel between a positive direct-current terminal (i.e., a high-potential-side direct-current terminal) Np and a negative direct-current terminal (i.e., a low-potential-side direct-current terminal) Nn.

The leg circuit 4 is provided for each of the AC phases. The leg circuit 4 is connected between the AC power system 12 and the DC line 14, and converts power therebetween.

The power converter 2 includes three leg circuits 4u, 4v, and 4w in correspondence with a U phase, a V phase, and a W phase, respectively, of the AC power system 12.

The leg circuits 4u, 4v, and 4w include alternating-current input terminals Nu, Nv, and Nw, respectively, which are connected to the AC power system 12 via the AC circuit breaker 17 and the transformer 13. In FIG. 1, for ease of illustration, the connections between the alternating-current input terminal Nv and the AC circuit breaker 17 and between the alternating-current input terminal Nw and the AC circuit breaker 17 are not shown. The positive direct-current terminal Np and the negative direct-current terminal Nn, which are commonly connected to each leg circuit 4, are connected to the DC line 14.

The leg circuit 4u includes an upper arm 5 extending from the positive direct-current terminal Np to the alternating-current input terminal Nu, and a lower arm 6 extending from the negative direct-current terminal Nn to the alternating-current input terminal Nu. The alternating-current input terminal Nu, which is a point of contact of the upper arm 5 and the lower arm 6, is connected to the AC circuit breaker 17. The leg circuits 4v and 4w also have the same configuration. Thus, the leg circuit 4u will be described representatively.

The upper arm 5 includes multiple cascade-connected sub modules 7, and a reactor 8A. The sub modules 7 and the reactor 8A are connected in series. The lower arm 6 includes multiple cascade-connected sub modules 7, and a reactor 8B. The sub modules 7 and the reactor 8B are connected in series.

The power conversion system 10 includes detectors for measuring the electrical quantities (e.g., current, voltage, etc.) which are used for control For example, the detectors include an AC voltage detector 18, an AC current detector 16, DC voltage detectors 11A and 11B, and arm current detectors 9A and 9B which are included in each leg circuit 4. Signals are detected by these detectors and input to the control device 3.

Based on the detected signals, the control device 3 outputs an operation command for controlling the operational states of the respective sub modules 7. The operation commands are generated in one-to-one correspondence with a U-phase upper arm, a U-phase lower arm, a V-phase upper arm, a V-phase lower arm, a W-phase upper arm, and a W-phase lower arm. The control device 3 also receives various information from respective sub modules 7. The various information is internal information of the sub modules 7, including voltage values of capacitors of the sub modules 7, state information indicating states of the sub modules 7, etc.

As a hardware configuration, the control device 3 typically includes an auxiliary transformer, an analog-to-digital (AD) converter unit, a computing unit, etc. The computing unit includes a central processing unit (CPU), a random access memory (RAM), and a read only memory (ROM). The AD converter unit includes an analog filter, a sample and hold circuit, a multiplexer, etc. The control device 3 may be configured of a digital protection and control device, for example.

For ease of illustration, FIG. 1 collectively illustrates some of signal lines for signals input from the respective detectors to the control device 3 and signal lines for signals input/output from/to the control device 3 to/from respective sub modules 7. In practice, however, the signal line is provided for each detector and each sub module 7. Separate signal lines may be provided for transmission and receipt of signals between each sub module 7 and the control device 3. The signal line is configured of an optical fiber, for example.

The AC voltage detector 18 detects an AC voltage Vacu of the U phase of the AC power system 12, an AC voltage Vacv of the V phase, and an AC voltage Vacw of the W phase of the AC power system 12. The AC current detector 16 detects an AC current Iacu of the U phase of the AC power system 12, an AC current Iacv of the V phase, and an AC current Iacw of the W phase of the AC power system 12. The DC voltage detector 11A detects a DC voltage Vdcp of the positive direct-current terminal Np connected to the DC line 14. The DC voltage detector 11B detects a DC voltage Vdcn of the negative direct-current terminal Nn connected to the DC line 14. A difference between the DC voltage Vdcp and the DC voltage Vdcn will be referred to as a DC voltage Vdc.

The arm current detectors 9A and 9B included in the leg circuit 4u for the U phase detect an arm current Ipu flowing through the upper arm 5 and an arm current Inu flowing through the lower arm 6, respectively. Similarly, the arm current detectors 9A and 9B included in the leg circuit 4v for the V phase detect an arm current Ipv and an arm current Inv, respectively. The arm current detectors 9A and 9B included in the leg circuit 4w for the W phase detect an arm current Ipw and an arm current Inw, respectively.

Configuration of Sub Module

Figure 2:
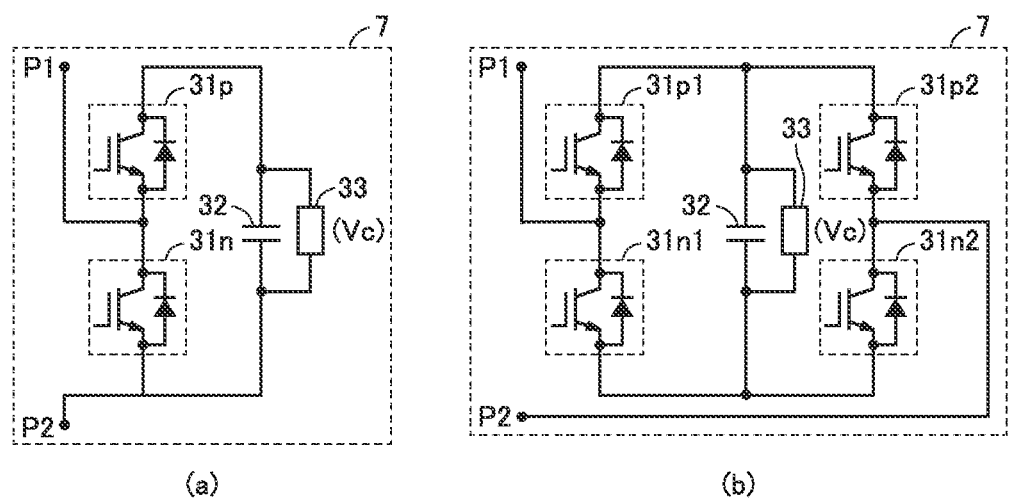
FIG. 2 is a circuit diagram of one example of a sub module.

FIG. 2 is a circuit diagram of one example of the sub module. The sub module 7 of (a) of FIG. 2 has a circuit structure, called a half-bridge configuration. The sub module 7 includes: a series body formed of two switching elements 31p and 31n being connected in series; a capacitor 32 as an energy storage; and a voltage detector 33. The series body and the capacitor 32 are connected in parallel. The voltage detector 33 detects a capacitor voltage Vc, which is a voltage across the capacitor 32.

The sub module 7 of (b) of FIG. 2 has a circuit structure, called a full-bridge configuration. The sub module 7 includes: a first series body formed of two switching elements 31p1 and 31n1 being connected in series; a second series body formed of two switching elements 31p2 and 31n2 being in series; a capacitor 32; and a voltage detector 33. The first series body, the second series body, and the capacitor 32 are connected in parallel. The voltage detector 33 detects the capacitor voltage Vc.

The two switching elements 31p and 31n of (a) of FIG. 2 and the four switching elements 31p1, 31n1, 31p2, and 31n2 of (b) of FIG. 2 are each configured of, for example, a freewheeling diode (FWD) being connected in anti-parallel to a self-arc-extinguishing semiconductor switching element such as an insulated gate bipolar transistor (IGBT), a gate commutated turn-off (GCT) thyristor, or a metal oxide semiconductor field-effect transistor (MOSFET). In (a) and (b) of FIG. 2, a capacitor such as a film capacitor is mainly used as the capacitor 32.

In the following description, the switching elements 31p, 31n, 31p1, 31n1, 31p2, and 31n2 will also be collectively referred to as a switching element 31. The on/off of a semiconductor switching element included in the switching element 31 is also described simply as "on/off of the switching element 31."

Referring to (a) of FIG. 2, the opposing terminals of the switching element 31n are referred to as input/output terminals P1 and P2. A voltage across the capacitor 32 and zero voltage are output by switching operations of the switching elements 31p and 31n. For example, the voltage across the capacitor 32 is output when the switching element 31p is on and the switching element 31n is off. Zero voltage is output when the switching element 31p is off and the switching element 31n is on. While (a) of FIG. 2 illustrates the input/output terminals P1 and P2 as the opposing terminals of the switching element 31n, the opposing terminals of the switching element 31p may be the input/output terminals P1 and P2, and in this case, the operation is reversed.

Next, referring to (b) of FIG. 2, the mid-point between the switching element 31p1 and the switching element 31n1, and the mid-point between the switching element 31p2 and the switching element 31n2 are the input/output terminals P1 and P2, respectively, of the sub module 7. The sub module 7 shown in (b) of FIG. 2 outputs a positive voltage or zero voltage by turning the switching element 31n2 on, the switching element 31p2 off, and alternately turning the switching elements 31p1 and 31n1 on. The sub module 7 shown in (b) of FIG. 2 can also output zero voltage or a negative voltage by turning the switching element 31n2 off, the switching element 31p2 on, and alternately turning the switching elements 31p1 and 31n1 on.

The following description is provided with reference to the sub module 7 as having the half-bridge configuration shown in (a) of FIG. 2 and use of the semiconductor switching element and the capacitor as an energy storage element. However, the sub module 7 may have the full-bridge configuration shown in (b) of FIG. 2. Moreover, any sub module having a configuration other than those described above may be used, for example, a sub module having a circuit structure, called a 1.5 half-bridge configuration applied thereto, in which the switching element 31p2 of (b) of FIG. 2 is replaced with a diode only.

Functions of Arrester

Figure 3:
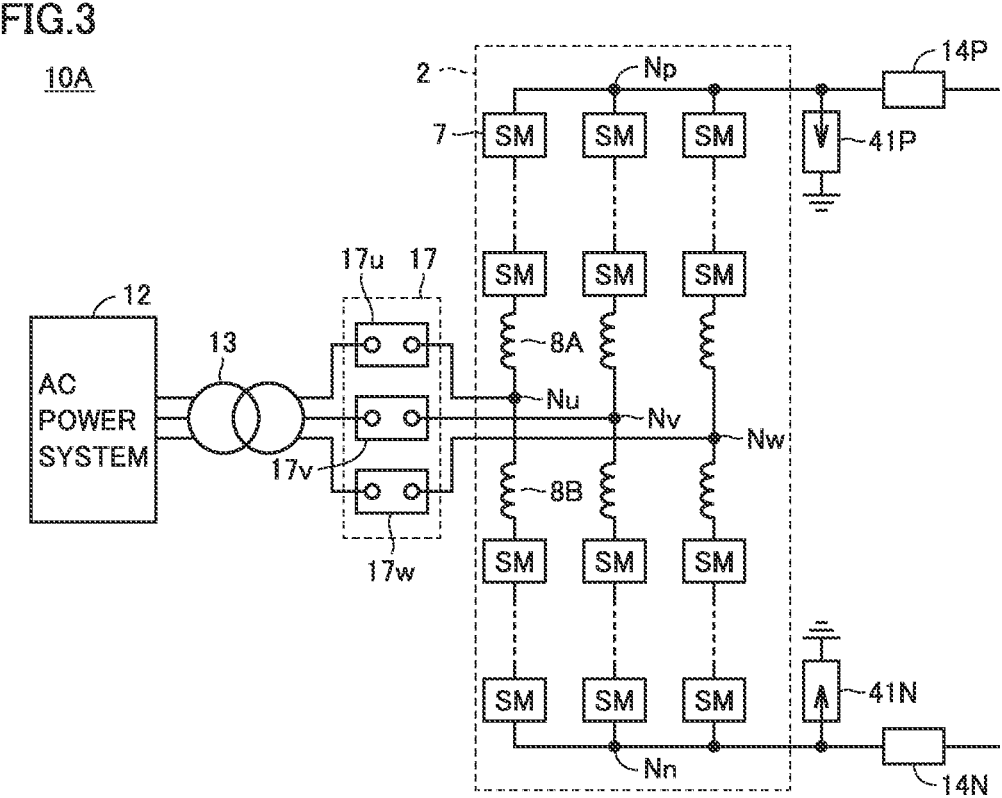
FIG. 3 is a diagram for illustrating a first configuration example of the power conversion system.

FIG. 3 is a diagram for illustrating a first configuration example of the power conversion system. The power conversion system of FIG. 3 corresponds to the configuration of the power conversion system 10 of FIG. 1. In the following description, the first configuration example of the power conversion system shown in FIG. 3 is also referred to as a "power conversion system 10A" for convenience. This applies the same for FIGS. 6 through 13. FIG. 3 denotes three AC circuit breakers 17u, 17v, and 17w in correspondence with the U phase, the V phase, and the W phase, respectively. However, for ease of illustration, FIG. 3 does not denote the control device 3, the various detectors, and the signal lines between the power converter 2 and the control device 3, etc.

Figure 4:
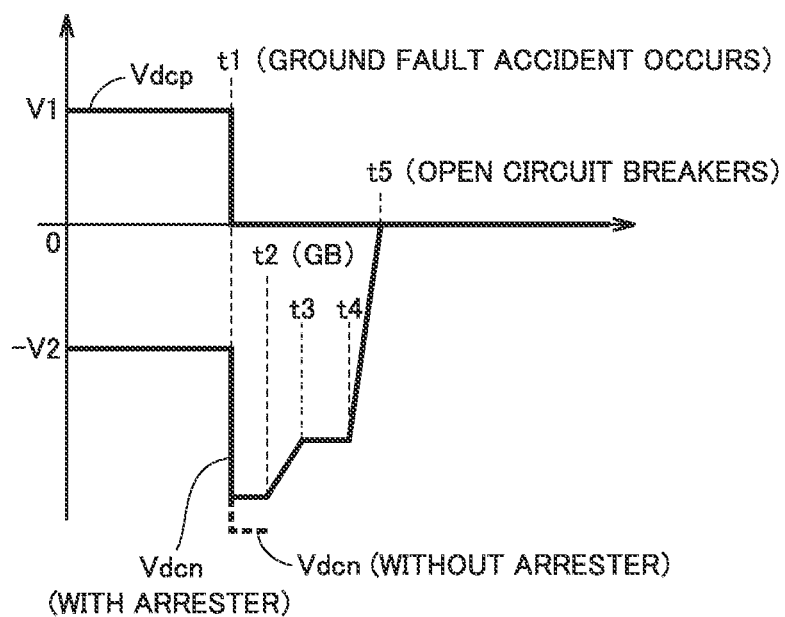
FIG. 4 is a diagram showing changes over time in waveform of direct-current voltages.

FIG. 4 is a diagram showing changes over time in waveform of DC voltages. Referring to FIG. 4, prior to the occurrence of the ground fault accident, the DC voltage Vdcp of the positive-side DC line 14P is V1 (where V1>0), and the DC voltage Vdcn of the negative-side DC line 14N is −V2 (where V2>0). Typically, V1=V2.

At time t1, in the event of a ground fault accident on the positive-side DC line 14P, the DC voltage Vdcp decreases to zero. As shown in FIG. 3, since the DC lines 14P and 14N are connected to the ground via the arresters 41P and 41N, respectively, DC short is avoided. However, since the entirety of the DC voltage is applied to the DC line 14N side, the DC voltage Vdcn decreases rapidly. Since the arrester 41N is provided in the present embodiment, the DC voltage Vdcn is suppressed by the arrester 41N as indicated by the solid lines. Without the arrester 41N, in contrast, the DC voltage Vdcn is not suppressed as indicated by the dotted lines, ending up in changing to an overvoltage condition beyond the insulation design.

As such, the arrester 41N has the function of preventing overvoltage from occurring at the DC line 14N along with a ground fault accident occurred on the DC line 14P. Similarly, the arrester 41P has the function of preventing overvoltage from occurring on the DC line 14P along with a ground fault accident occurred on the DC line 14N. Note that, for example, if a ground fault accident is highly unlikely to occur on one of the DC lines 14P and 14N, the arrester 41 may be connected only to the other one of the DC lines 14P and 14N, without being connected to the one of the DC lines 14P and 14N.

Moreover, for example, the arrester 41P is arranged to have a clamping voltage less than the rated voltage value of the positive direct-current terminal Np (i.e., the rated voltage value of the DC voltage Vdcp), and the arrester 41N is arranged to have a clamping voltage less than an absolute value of the rated voltage value of the negative direct-current terminal Nn (i.e., an absolute value of a value of the rated voltage of the DC voltage Vdcp).

Next, the control device 3 detects the ground fault accident occurred on the DC line 14N at time t1, and stops the switching operation by the power converter 2 at time t2. Specifically, the control device 3 gate-blocks the power converter 2, stopping the switching operation of the respective sub modules 7 within the power converter 2. Accordingly, due to the rectifier action of the diode in a respective sub module 7, the absolute value of the DC voltage Vdcn decreases to the freewheeling diode rectification voltage of the sub module 7 at time t3. Subsequently, at time t4 after the switching operation of the power converter 2 is stopped, the control device 3 outputs commands for opening the AC circuit breakers 17u, 17v, and 17w. At time t5, the AC circuit breakers 17u, 17v, and 17w are opened, and the DC voltage Vdcn is zero.

Procedure

Figure 5:
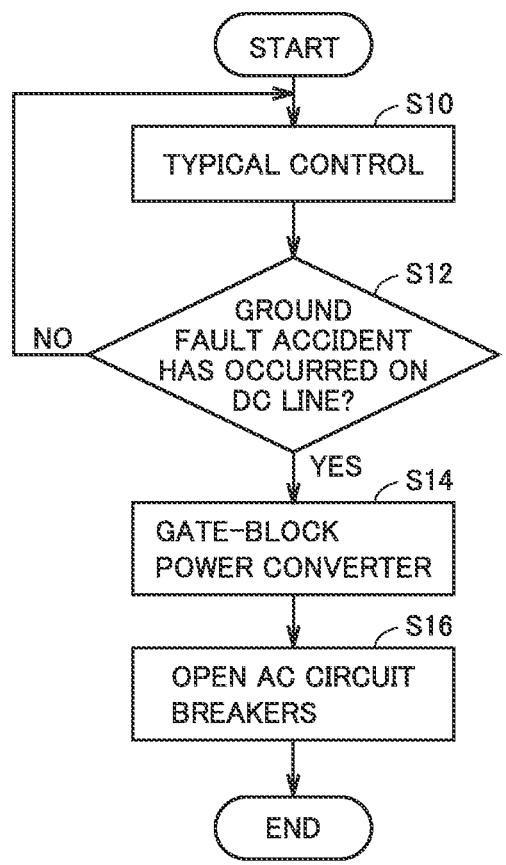
FIG. 5 is a flowchart of a procedure for a process performed by a control device according to Embodiment 1.

FIG. 5 is a flowchart of a procedure for a process performed by the control device 3 according to Embodiment 1. Typically, the following steps are performed by the computing unit of the control device 3.

Referring to FIG. 5, once the initial charging of the power converter 2 (i.e., the initial charging of the capacitors 32) is completed, the control device 3 outputs operation start commands and performs a typical control (step S10). Specifically, the control device 3 controls output voltages of the sub modules 7 included in the respective leg circuits 4.

Next, based on the currents flowing through the sub modules 7, the control device 3 determines whether a ground fault accident has occurred on the DC line 14 (step S12). For example, if at least one of absolute values of the arm currents Ipu, Ipv, Ipw, Inu, Inv, Inw detected by the arm current detectors 9A and 9B is greater than a threshold Th1, or if the total value of each phase of the arm currents is greater than a threshold Th2, the control device 3 determines that a ground fault accident has occurred on the DC line 14. Note that if a current detector is connected to the arrester 41, the control device 3 may determine that a ground fault accident has occurred if a DC current detected by the current detector is greater than a threshold Th3. Moreover, the control device 3 may determine that a ground fault accident has occurred if any of the DC voltages detected by the DC voltage detectors 11A and 11B is greater than a threshold Th4, or if any of the AC voltages detected by the AC voltage detector 18 is greater than a threshold Th5.

If no ground fault accident is present (NO in step S12), the control device 3 performs the process step S10. In the event of a ground fault accident (YES in step S12), the control device 3 gate-blocks the power converter 2 (step S14). Specifically, the control device 3 turns off the switching elements of all the sub modules 7 included in the respective leg circuits 4. Subsequently, the control device 3 opens each AC circuit breaker 17 (step S16). Specifically, the control device 3 outputs an open command (e.g., a trip signal) to each AC circuit breaker 17.

As described above, according to the power conversion system 10A, DC short can be avoided in the event of a ground fault accident on the DC line, and the DC voltage developed in the event of a ground fault accident can also be suppressed by the arresters. Owing to this, the elements of the power converter 2 can be prevented from breaking down.

Other Configuration Examples of Power Conversion System

Other configuration examples of the power conversion system are now described. Note that operations of the control device 3 in power conversion systems 10B, 10C, 10D, 10E, 10F, 10G, and 10H described below are the same as that described with respect to FIG. 5.

Figure 6:
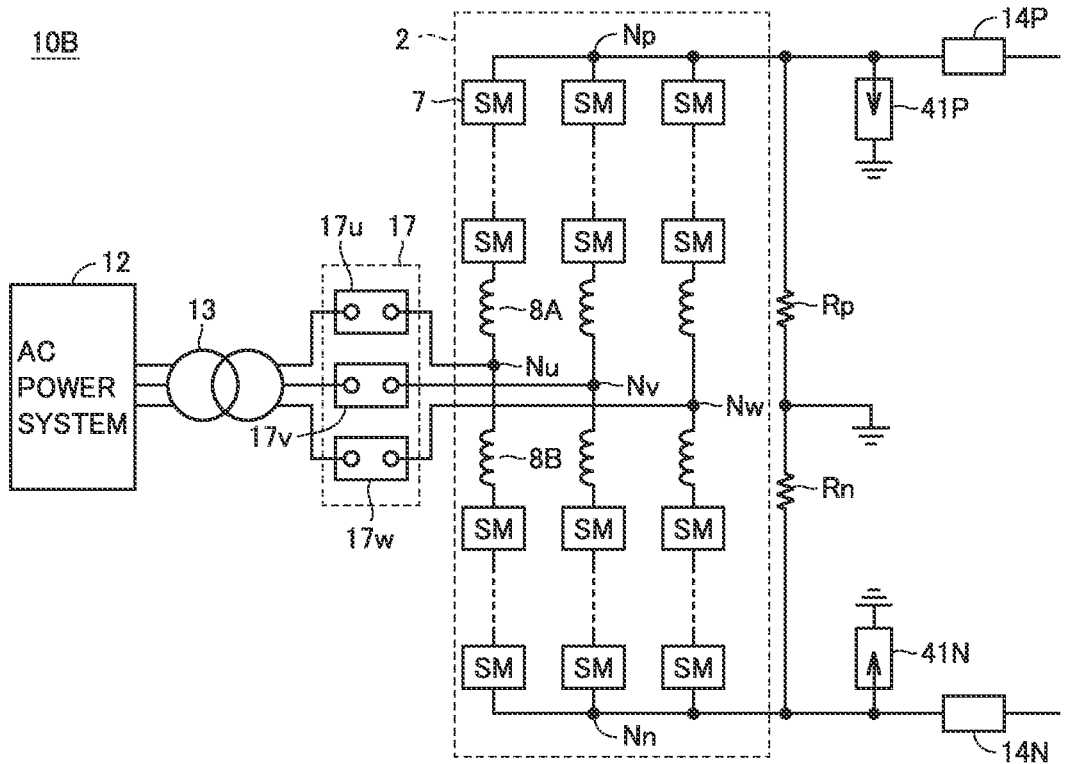
FIG. 6 is a diagram for illustrating a second configuration example of the power conversion system.

FIG. 6 is a diagram for illustrating a second configuration example of the power conversion system. Referring to FIG. 6, the power conversion system 10B is the same as the power conversion system 10A of FIG. 3, except for the power conversion system 10B further including resistors Rp and Rn.

The resistor Rp is connected to the DC line 14P. Specifically, the resistor Rp has a high-potential side connected to the DC line 14P, and a low-potential side connected to the ground and the resistor Rn. The resistor Rn is connected to the DC line 14N. Specifically, the resistor Rn has a low-potential side connected to the DC line 14N, and a high-potential side connected to the ground and the resistor Rp. The mid-point between the resistor Rp and the resistor Rn is grounded. Typically, the resistor Rp and the resistor Rn have the same resistance, and an intermediate potential between the DC lines 14P and 14N is therefore grounded.

In addition to the advantageous effects of the power conversion system 10A, according to the power conversion system 10B, the ground DC potential of the power converter 2 is securely fixed. This prevents the ground voltages of the positive and negative lines of the power converter 2 from being extremely unbalanced, thereby avoiding a too high insulation design due to taking into account of unbalanced voltages.

Figure 7:
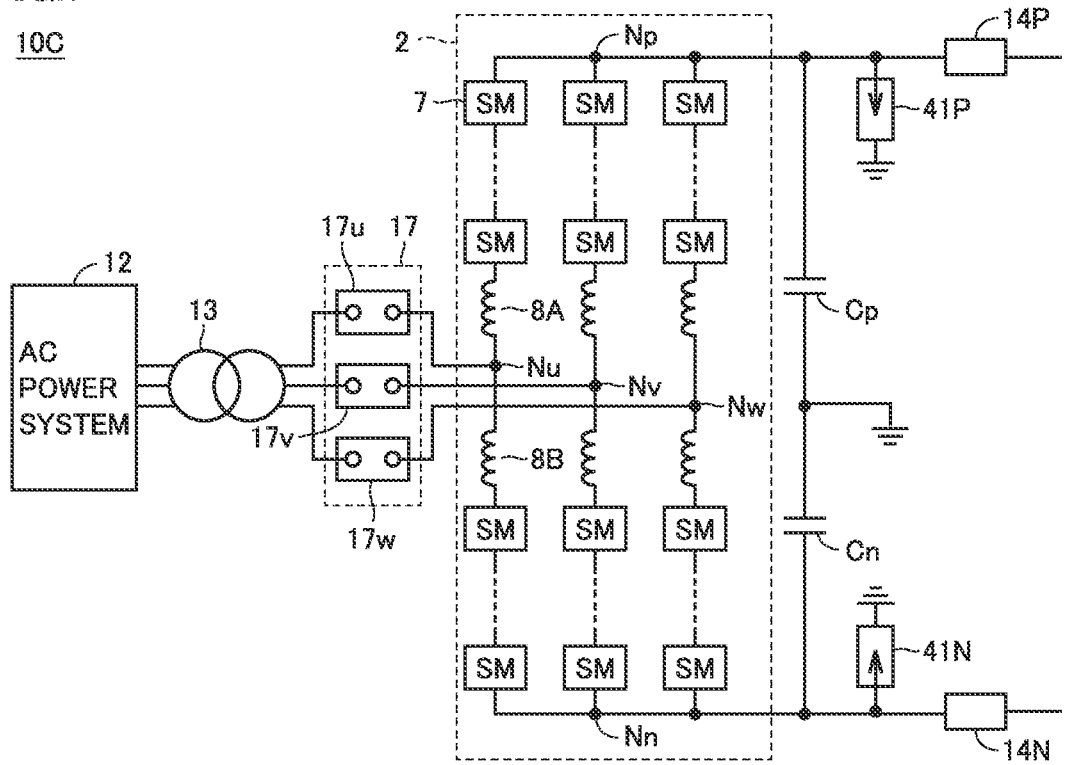
FIG. 7 is a diagram for illustrating a third configuration example of the power conversion system.

FIG. 7 is a diagram for illustrating a third configuration example of the power conversion system. Referring to FIG. 7, the power conversion system 10C is the same as the power conversion system 10A of FIG. 3, except for the power conversion system 10C further including capacitors Cp and Cn.

The capacitor Cp is connected to the DC line 14P. Specifically, the capacitor Cp has a high-potential side connected to the DC line 14P, and a low-potential side connected to the ground and the capacitor Cn. The capacitor Cn is connected to the DC line 14N. Specifically, the capacitor Cn has a low-potential side connected to the DC line 14N, and a high-potential side connected to the ground and the capacitor Cp. The mid-point between the capacitor Cp and the capacitor Cn is grounded. Typically, the capacitor Cp and the capacitor Cn have the same capacitance, and an intermediate potential between the DC lines 14P and 14N is therefore grounded.

In addition to the advantageous effects of the power conversion system 10A, according to the power conversion system 10C, the ground DC potential of the power converter 2 is securely fixed.

Figure 8:
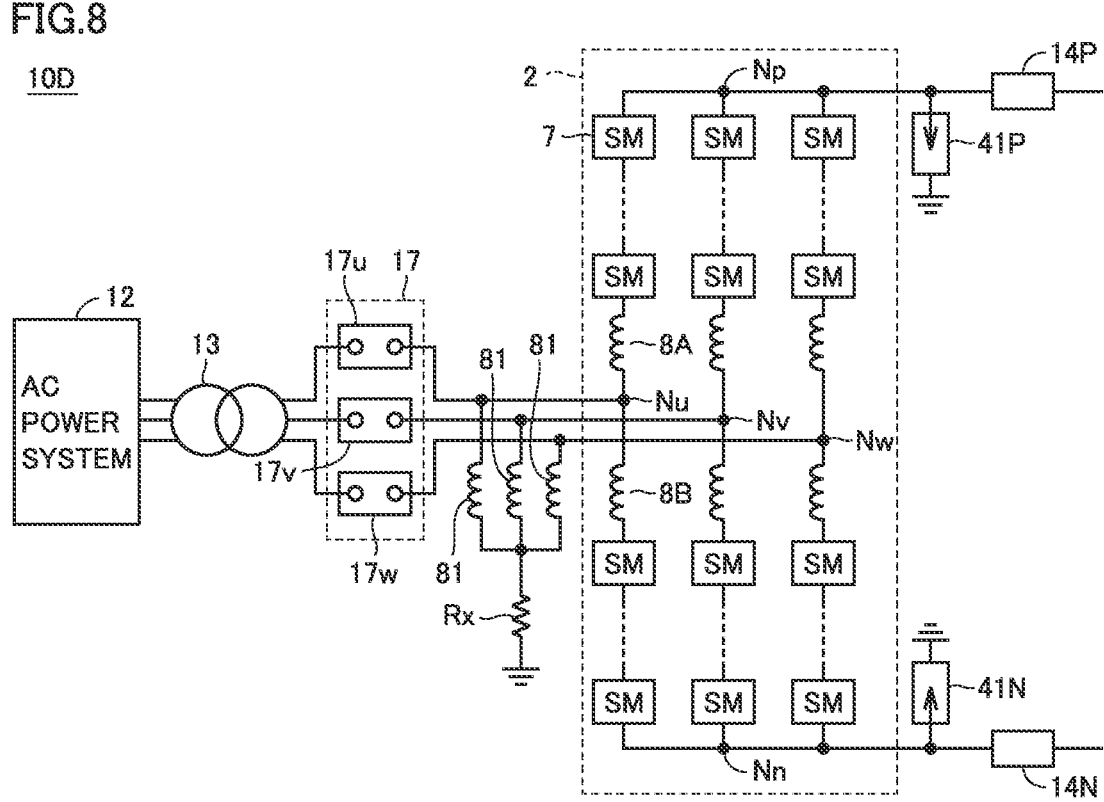
FIG. 8 is a diagram for illustrating a fourth configuration example of the power conversion system.

FIG. 8 is a diagram for illustrating a fourth configuration example of the power conversion system. Referring to FIG. 8, the power conversion system 10D is the same as the power conversion system 10A of FIG. 3, except for the power conversion system 10D having the AC lines of the power converter 2 being grounded.

Specifically, the respective phases (e.g., the U phase, the V phase, the W phase) of the AC lines connecting the AC circuit breaker 17 and the power converter 2 are connected to the ground via an impedance circuit. Specifically, the respective phases of the AC lines are grounded via a series circuit which is formed of reactors 81 and a resistor Rx. In addition to the advantageous effects of the power conversion system 10A, according to the power conversion system 10D, the ground DC potential of the power converter 2 is securely fixed.

Figure 9:
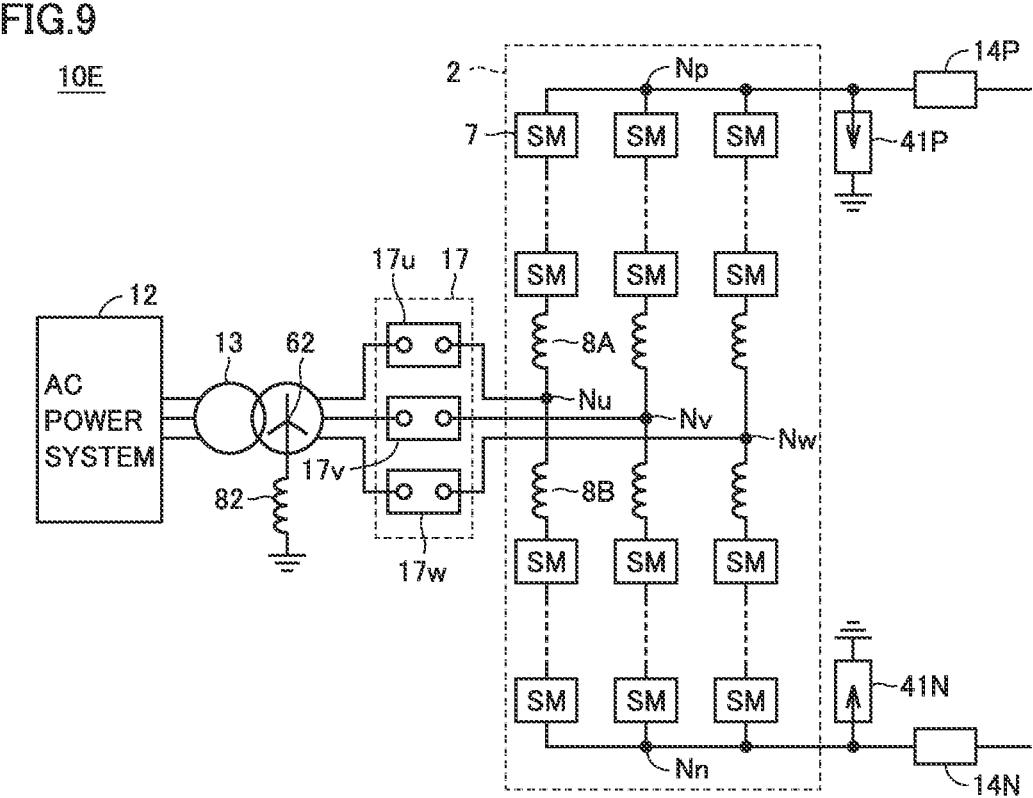
FIG. 9 is a diagram for illustrating a fifth configuration example of the power conversion system.

FIG. 9 is a diagram for illustrating a fifth configuration example of the power conversion system. Referring to FIG. 9, the power conversion system 10E is the same as the power conversion system 10A of FIG. 3, except for the power conversion system 10E having the secondary side of the transformer 13 being grounded.

Specifically, the secondary winding of the transformer 13 is connected in a Y connection in the power conversion system 10E. The secondary side of the transformer 13 has a neutral point 62 grounded via the reactor 82. Note that the primary winding of the transformer 13 may be configured in a Y connection or in a delta connection. In addition to the advantageous effects of the power conversion system 10A, according to the power conversion system 10E, the ground DC potential of the power converter 2 is securely fixed.

Figure 10:
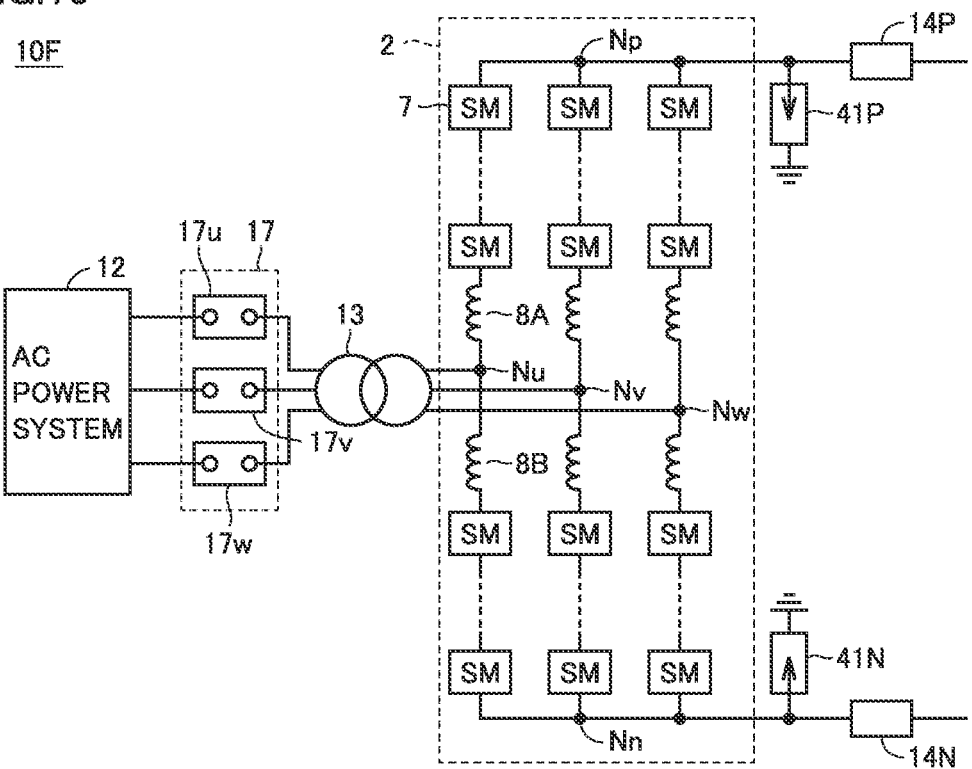
FIG. 10 is a diagram for illustrating a sixth configuration example of the power conversion system.

FIG. 10 is a diagram for illustrating a sixth configuration example of the power conversion system. Referring to FIG. 10, the power conversion system 10F is the same as the power conversion system 10A of FIG. 3, except for the power conversion system 10F having the transformer 13 located differently.

Specifically, the transformer 13 of the power conversion system 10F is connected between the AC circuit breaker 17 and the power converter 2. In other words, the AC circuit breaker 17 is connected to the primary side of the transformer 13, and the power converter 2 is connected to the secondary side of the transformer 13. The power conversion system 10F has the same advantageous effects as the power conversion system 10A.

Note that the transformer 13 may be connected between the AC circuit breaker 17 and the power converter 2 even in the power conversion systems 10B through 10E, as with the power conversion system 10F of FIG. 10.

Figure 11:
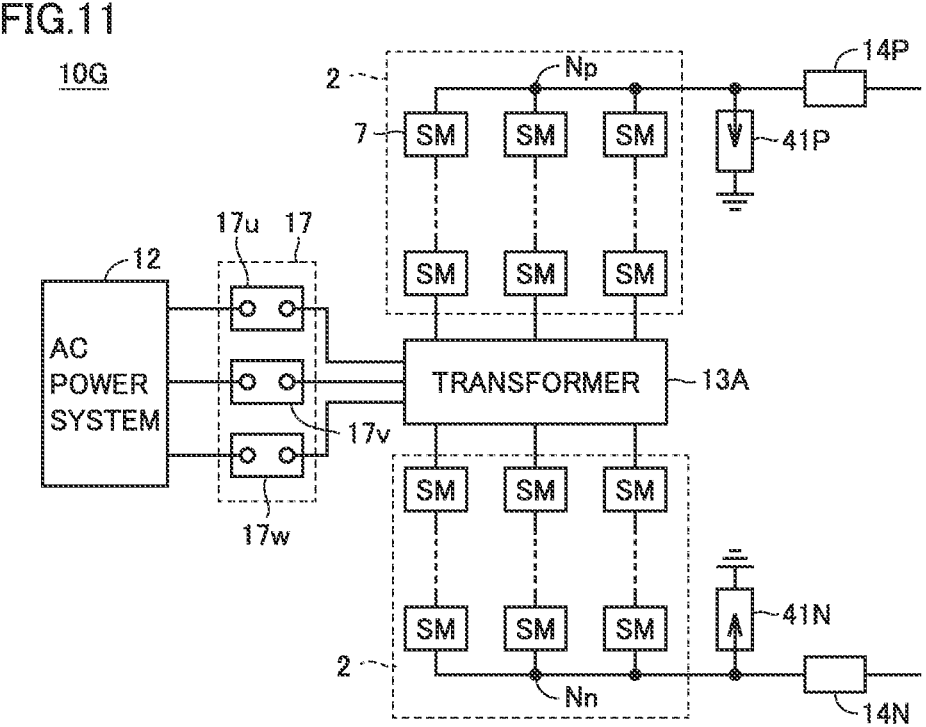
FIG. 11 is a diagram for illustrating a seventh configuration example of the power conversion system.

FIG. 11 is a diagram for illustrating a seventh configuration example of the power conversion system. Referring to FIG. 11, in the power conversion system 10G, the upper arm 5 and the lower arm 6 of each leg circuit 4 are connected to the AC circuit breaker 17 via a transformer 13A that has an impedance corresponding to that reactor, rather than being connected to a reactor as in the power conversion system 10A. The power conversion system 10G has the same advantageous effects as the power conversion system 10A.

Figure 12:
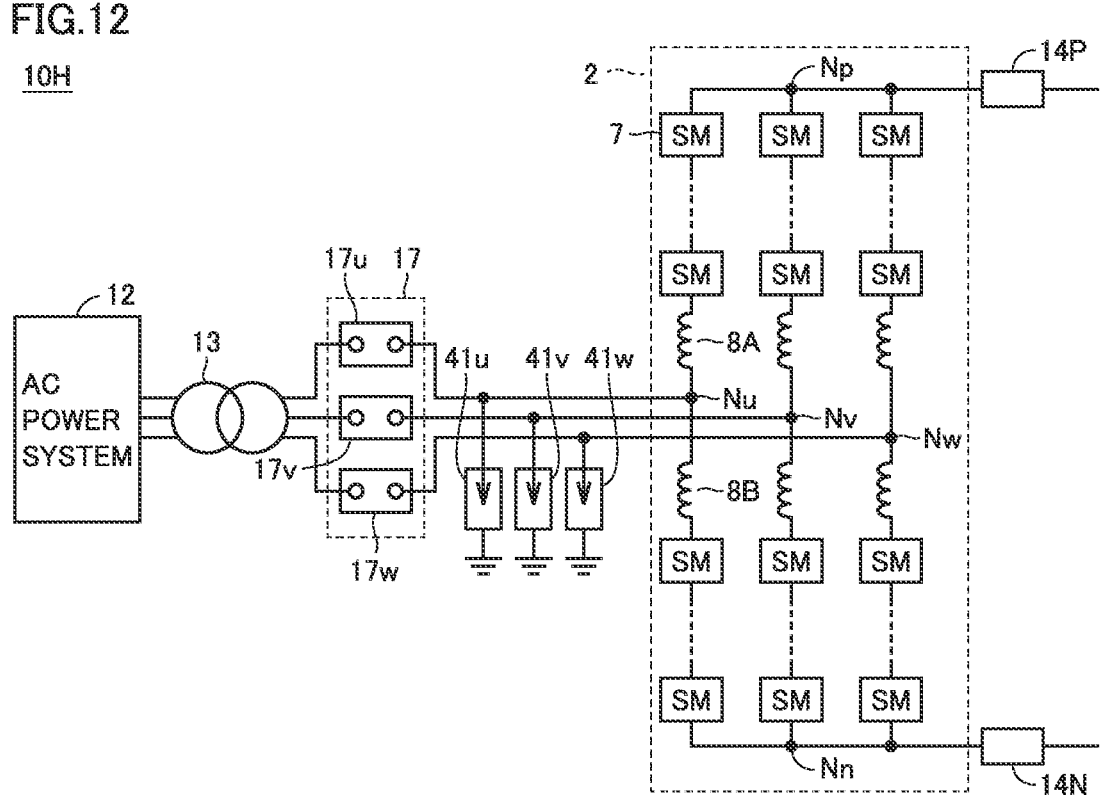
FIG. 12 is a diagram for illustrating an eighth configuration example of the power conversion system.

FIG. 12 is a diagram for illustrating an eighth configuration example of the power conversion system. Referring to FIG. 12, the arrester 41 of the power conversion system 10H is connected to the AC line, instead of the arrester 41 being connected to the DC line 14 as in the power conversion system 10A of FIG. 3.

Specifically, the arrester 41u is connected between the U phase of the AC line and the ground. The arrester 41v is connected between the V phase of the AC line and the ground. The arrester 41w is connected between the W phase of the AC line and the ground.

For example, in the event of a ground fault accident on the DC line 14P, the potential of the DC line 14P on the ground fault side varies. At the same time, the potentials on the AC lines also vary. The potentials on the AC line (i.e., the AC lines) are constrained to a predetermined range by the arresters 41u, 41v, and 41w connected to the AC side, thereby indirectly suppressing the variations in potential of the DC line 14N on the non-ground fault side. This can prevent the DC voltage Vdcn on the DC line 14N from changing to an overvoltage condition, as described with respect to FIG. 4.

As such, the arresters 41u, 41v, and 41w each have the function of preventing overvoltage from occurring on the other DC line 14 along with a ground fault accident on one DC line 14. The arresters 41u, 41v, and 41w are each designed to prevent the voltage developed on the DC line 14 on the non-ground fault side from changing to an overvoltage condition beyond the insulation design. According to the power conversion system 10H, the same advantageous effects as the power conversion system 10A are provided.

Embodiment 2

Embodiment 1 has been described with respect to the configuration in which the power converter 2 is gate-blocked and the AC circuit breaker 17 is then opened in the event of a ground fault accident on the DC line 14. Embodiment 2 will be described with respect to a configuration in which a power converter 2 is gate-blocked and a DC circuit breaker is then opened in the event of a ground fault accident.

Figure 13:
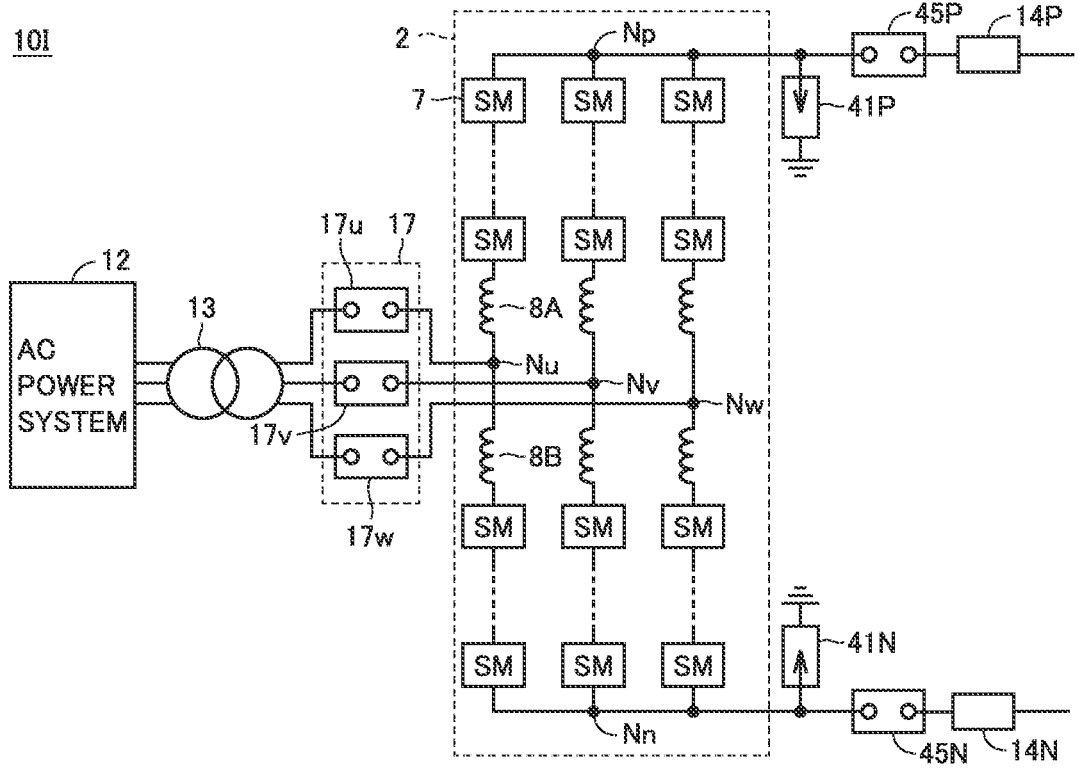
FIG. 13 is a diagram for illustrating a power conversion system according to Embodiment 2.

FIG. 13 is a diagram for illustrating a power conversion system 10I according to Embodiment 2. Referring to FIG. 13, the power conversion system 10I has a configuration in which DC circuit breakers 45P and 45N (hereinafter, also collectively referred to as a "DC circuit breaker 45") are connected to the DC lines 14P and 14N, respectively, of the power conversion system 10A of FIG. 3. Specifically, the DC circuit breaker 45P is disposed between the DC line 14P and the power converter 2. The DC circuit breaker 45N is disposed between the DC line 14N and the power converter 2.

The functions of the arresters 41P and 41N in the power conversion system 10I are the same as those described above. Here, the operations are described in the event of a ground fault accident on the DC line 14P. Once detected the ground fault accident on the DC line 14P, a control device 3 gate-blocks the power converter 2. Subsequently, the control device 3 outputs commands for opening the DC circuit breakers 45P and 45N, and the DC circuit breakers 45P and 45N are opened. At this time, a DC voltage on the DC line 14 side when viewed from the DC circuit breaker 45 is zero. Moreover, a DC voltage (i.e., a DC voltage Vdcp) on the power converter 2 side when viewed from the DC circuit breaker 45P, and a DC voltage (i.e., a DC voltage Vdcn) on the power converter 2 side when viewed from the DC circuit breaker 45N are based on a freewheeling diode rectification voltage of a sub module 7.

Figure 14:
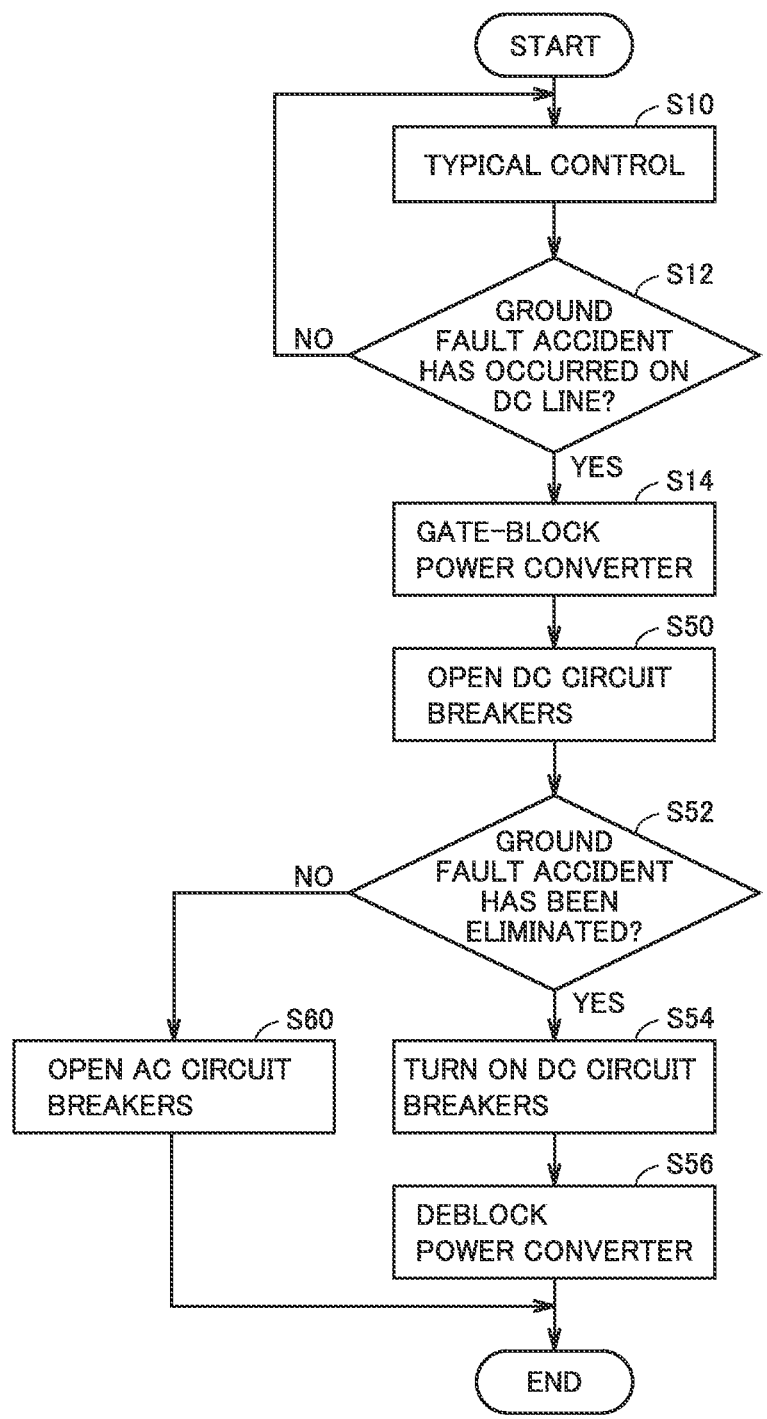
FIG. 14 is a flowchart of a procedure for a process performed by a control device according to Embodiment 2.

FIG. 14 is a flowchart of a procedure for a process performed by the control device 3 according to Embodiment 2. Typically, the following steps are performed by a computing unit of the control device 3.

Referring to FIG. 14, steps S10 through S14 are the same as those of FIG. 5, and the description thereof is thus not repeated.

After gate-blocking the power converter 2 (step S14), the control device 3 opens the DC circuit breakers 45P and 45N (step S50). The control device 3 determines whether a ground fault accident has been eliminated (step S52). For example, if a DC voltage on the DC line 14P side when viewed from the DC circuit breaker 45P is greater than or equal to a threshold Th6, the control device 3 determines that the ground fault accident has been eliminated. Note that the DC voltage on the DC line 14P side is detected by a dedicated DC voltage detector, and the detected signal is input to the control device 3.

If the ground fault accident is eliminated (YES in step S52), the control device 3 turns on the DC circuit breakers 45P and 45N (i.e., closes the circuit) (step S54). Subsequently, the control device 3 deblocks the power converter 2 (step S56). This returns the power converter 2 back to the typical control. If the ground fault accident is not eliminated (NO in step S52), in contrast, the control device 3 opens the AC circuit breakers 17 (step S60). In this case, the ground fault accident is highly likely to be a permanent accident. Thus, after the ground fault accident is eliminated by a system operator or the like, the AC circuit breaker 17 and the DC circuit breaker 45 are turned on, and the power converter 2 is deblocked by a suitable procedure. Subsequently, the control device 3 performs a typical control over the power converter 2.

In the above, steps S54 and S56 may be performed in the reversed order. In other words, the control device 3 may deblock the power converter 2, and then turn on the DC circuit breakers 45P and 45N.

In addition to the advantageous effects of the power conversion system 10A, according to the power conversion system 10I of Embodiment 2, if the ground fault accident is a temporary accident, the power converter 2 can be rebooted by opening and closing the DC circuit breaker 45, without opening the AC circuit breaker 17. Owing to this, the power converter 2 can be promptly returned to the typical control after a ground fault accident is eliminated.

Other Embodiments (1) In the embodiments described above, the arrester 41 is connected to the DC line 14 in the power conversion systems 10B through 10G of FIGS. 6 through 11. However, the present disclosure is not limited thereto. For example, as with the power conversion system 10H of FIG. 12, the power conversion systems 10B through 10G may have the arrester 41 connected to the AC line connecting the power converter 2 and the AC circuit breaker 17. If the transformer 13 is connected between the power converter 2 and the AC circuit breaker 17 as with the power conversion system 10F, the arrester 41 may be connected to the AC line between the transformer 13 and the power converter 2 or the AC line between the transformer 13 and the AC circuit breaker 17. For the power conversion system 10G, the arrester 41 may be connected to the AC line between the transformer 13A and the AC circuit breaker 17.

(2) While the power conversion system 10I according to Embodiment 2 has been described above with reference to the DC circuit breaker 45 being connected to the DC line 14 of the power conversion system 10A of FIG. 3, the present disclosure is not limited thereto. For example, as with the power conversion system 10I of FIG. 13, the power conversion systems 10B through 10H of FIGS. 6 through 12 may have the DC circuit breaker 45 connected between the DC line 14 and the power converter 2.

(3) The configurations exemplified as the above-described embodiments are one example configuration of the present disclosure, and can be combined with other known technique, or can be modified, such as part of the configuration being omitted, without departing from the gist of the present disclosure. Moreover, in the above-described embodiments, the processes and configurations described in the other embodiments may be appropriately adapted and implemented.

The presently disclosed embodiment should be considered in all aspects as illustrative and not restrictive. The scope of the present disclosure is indicated by the appended claims, rather than by the description above, and all changes that come within the scope of the claims and the meaning and range of equivalency of the claims are intended to be embraced within their scope.

REFERENCE SIGNS LIST 2 power converter; 3 control device; $4u$, $4v$, $4w$ leg circuit; 5 upper arm; 6 lower arm; 7 sub module; 8A, 8B, 81, 82 reactor; 9A, 9B detector; 10, 10A through 10I power conversion system; 11A, 11B DC voltage detector; 12 AC power system; 13, 13A transformer; 14 DC line; 16 AC current detector; 17 AC circuit breaker; 18 AC voltage detector; $31n$, $31n2$, $31n1$, $31p2$, $31p$, $31p1$ switching element; 32, Cn, Cp capacitor; 33 voltage detector; 41N, 41P, $41u$, $41v$, $41w$ arrester; and 45N, 45P DC circuit breaker.

The invention claimed is:

1. A power conversion system, comprising:
 a self-excited power converter that converts power between an alternating-current (AC) power system and a direct-current (DC) line;
 an AC circuit breaker disposed between the AC power system and the self-excited power converter;
 an arrester connected directly between the DC line and a ground; and
 a control device, wherein
 the arrester and the DC line are provided outside the self-excited power converter, wherein
 the self-excited power converter includes three leg circuits corresponding to three phases of the AC circuit and a DC terminal which are commonly connected to the three leg circuits, wherein
 the DC terminal is connected to the DC line provided outside the self-excited power converter, wherein
 no DC circuit breaker is disposed on a DC line side of the self-excited power converter, and wherein
 the control device:
 causes the self-excited power converter to stop a switching operation when the control device detects a ground fault accident on the DC line; and
 opens the AC circuit breaker after the self-excited power converter stops the switching operation.

2. The power conversion system according to claim 1, wherein
 the self-excited power converter is a modular multilevel converter.

3. A power conversion system, comprising:
a self-excited power converter that converts power between an alternating-current (AC) power system and a direct-current (DC) line;
an AC circuit breaker disposed between the AC power system and the self-excited power converter;
an arrester connected directly between the DC line and a ground; and
a control device, wherein
the arrester and the DC line are provided outside the self-excited power converter, wherein
the self-excited power converter includes three leg circuits corresponding to three phases of the AC circuit and a DC terminal which are commonly connected to the three leg circuits, wherein
the DC terminal is connected to the DC line provided outside the self-excited power converter, wherein
the control device:
causes the self-excited power converter to stop a switching operation when the control device detects a ground fault accident on the DC line; and
opens the AC circuit breaker after the self-excited power converter stops the switching operation, and wherein
a first resistor is connected to a positive side of the DC line, and a second resistor is connected to a negative side of the DC line,
a mid-point of the first resistor and the second resistor is grounded, and
the first resistor and the second resistor are provided outside the self-excited power converter.

4. The power conversion system according to claim 3, wherein
the self-excited power converter is a modular multilevel converter.

5. A power conversion system, comprising:
a self-excited power converter that converts power between an alternating-current (AC) power system and a direct-current (DC) line;
an AC circuit breaker disposed between the AC power system and the self-excited power converter;
an arrester connected directly between the DC line and a ground; and
a control device, wherein
the arrester and the DC line are provided outside the self-excited power converter, wherein
the self-excited power converter includes three leg circuits corresponding to three phases of the AC circuit and a DC terminal which are commonly connected to the three leg circuits, wherein
the DC terminal is connected to the DC line provided outside the self-excited power converter, wherein
the control device:
causes the self-excited power converter to stop a switching operation when the control device detects a ground fault accident on the DC line; and
opens the AC circuit breaker after the self-excited power converter stops the switching operation, and wherein
a first capacitor is connected to a positive side of the DC line, and a second capacitor is connected to a negative side of the DC line,
a mid-point of the first capacitor and the second capacitor is grounded, and
the first capacitor and the second capacitor are provided outside the self-excited power converter.

6. The power conversion system according to claim 5, wherein
the self-excited power converter is a modular multilevel converter.

7. A power conversion system, comprising:
a self-excited power converter that converts power between an alternating-current (AC) power system and a direct-current (DC) line;
an AC circuit breaker disposed between the AC power system and the self-excited power converter;
an arrester connected directly between the DC line and a ground; and
a control device, wherein
the arrester and the DC line are provided outside the self-excited power converter, wherein
the self-excited power converter includes three leg circuits corresponding to three phases of the AC circuit and a DC terminal which are commonly connected to the three leg circuits, wherein
the DC terminal is connected to the DC line provided outside the self-excited power converter, wherein
the control device:
causes the self-excited power converter to stop a switching operation when the control device detects a ground fault accident on the DC line; and
opens the AC circuit breaker after the self-excited power converter stops the switching operation, wherein
an AC line is grounded only via a series circuit formed of a reactor and a resistor, the AC line connecting the AC circuit breaker and the self-excited power converter.

8. The power conversion system according to claim 7, wherein
the self-excited power converter is a modular multilevel converter.

* * * * *